United States Patent
Weber et al.

(10) Patent No.: US 11,821,332 B2
(45) Date of Patent: Nov. 21, 2023

(54) BALANCING OF A ROTATIONALLY SYMMETRICAL COMPONENT, PARTICULARLY A ROTOR COMPONENT

(71) Applicant: MTU Aero Engines AG, Munich (DE)

(72) Inventors: Michael Weber, Munich (DE); Onur Senusta, Karlsfeld (DE)

(73) Assignee: MTU Aero Engines AG, Munich (DE)

( * ) Notice: Subject to any disclaimer, the term of this patent is extended or adjusted under 35 U.S.C. 154(b) by 568 days.

(21) Appl. No.: 16/977,744

(22) PCT Filed: Mar. 5, 2019

(86) PCT No.: PCT/DE2019/000052
§ 371 (c)(1),
(2) Date: Sep. 2, 2020

(87) PCT Pub. No.: WO2019/170184
PCT Pub. Date: Sep. 12, 2019

(65) Prior Publication Data
US 2021/0003013 A1 Jan. 7, 2021

(30) Foreign Application Priority Data
Mar. 5, 2018 (DE) ...................... 10 2018 203 214.9

(51) Int. Cl.
*F01D 5/02* (2006.01)
*G01M 1/14* (2006.01)

(52) U.S. Cl.
CPC ............... *F01D 5/027* (2013.01); *G01M 1/14* (2013.01); *F05D 2260/15* (2013.01)

(58) Field of Classification Search
CPC ........... F01D 5/027; G01M 1/14; G01M 3/34; F05D 2260/15; H02K 15/16; H02K 15/165
See application file for complete search history.

(56) References Cited

U.S. PATENT DOCUMENTS

| 5,724,271 A | 3/1998 | Bankert et al. |
| 7,553,125 B2 * | 6/2009 | Audic .................. F01D 11/008 415/118 |

(Continued)

FOREIGN PATENT DOCUMENTS

| DE | 3310907 A1 | 10/1983 |
| DE | 10013035 A1 | 9/2001 |

(Continued)

OTHER PUBLICATIONS

"Automatic balancing strategy for a magnetic bearing elastic rotor with balancing actuators", The mechanical engineering department at the Technical University of Darmstadt to Obtaining the degree of doctoral engineer (Dr.—Ing.), Approved, pp. 1-165, M.Sc. Francis Fomi Wamba, Cameroun, 2009.

(Continued)

*Primary Examiner* — Lawrence Averick
(74) *Attorney, Agent, or Firm* — Hinckley, Allen & Snyder, LLP; David R. Josephs

(57) ABSTRACT

The invention relates to a method for determining a balancing removal process for a balancing device for balancing a rotationally symmetrical component, particularly a rotor component, particularly of a turbomachine, a combination of machining lengths and depths being calculated, taking into account a pre-defined maximum machining length and minimum machining depth, in such a way that, with reliable combinations for compensating the same unbalance, the machining length of the calculated combination is longer than the machining length of at least one other permissible combination and, at the same time, the machining depth of the calculated combination is shallower than the machining depth of said other combination.

18 Claims, 3 Drawing Sheets

(56) References Cited

U.S. PATENT DOCUMENTS

| | | | |
|---|---|---|---|
| 7,784,592 B1 | 8/2010 | Denstedt et al. | |
| 2006/0272407 A1* | 12/2006 | Audic | G01M 1/34 |
| | | | 73/460 |
| 2013/0257189 A1* | 10/2013 | Blum | H02K 15/165 |
| | | | 29/598 |
| 2013/0340521 A1* | 12/2013 | Clark | F01D 5/26 |
| | | | 73/462 |
| 2016/0265359 A1* | 9/2016 | Annati | F01D 5/027 |
| 2021/0003013 A1* | 1/2021 | Weber | G01M 1/14 |

FOREIGN PATENT DOCUMENTS

| | | |
|---|---|---|
| DE | 102008016937 A1 | 10/2009 |
| DE | 102016112521 A1 | 1/2018 |
| EP | 1936114 A2 | 6/2008 |
| EP | 3139044 A1 | 3/2017 |
| WO | 2004001363 A1 | 12/2003 |
| WO | 2004048918 A1 | 6/2004 |

OTHER PUBLICATIONS

"Balancing rigid bodies", Victory University, Department 11—Machine Technology Institute for Mechanics and Control Engineering (IMR), pp. 1-29, Univ.—Prof. Dr.—Ing. Kerstin Weinberg, 2017.
"Dynamic Propeller balancing", IDS Innomic, Society for computer and measurement technology, pp. 1-19, Dipl.—Ing. Thomas Olschewski, Mar. 30, 2007.

\* cited by examiner

BALANCING OF A ROTATIONALLY SYMMETRICAL COMPONENT, PARTICULARLY A ROTOR COMPONENT

BACKGROUND OF THE INVENTION

The present invention relates to a method for the balancing of a rotationally symmetrical component, particularly a rotor component, particularly of a turbomachine, by means of a balancing device; a method for determining a balancing removal process therefor; as well as a system and a computer program product for carrying out one of these methods.

Rotationally symmetrical components, particularly gas turbine rotor components, in particular of aircraft engines, should have at most a small unbalance, in order to prevent unfavorable loads during operation.

SUMMARY OF THE INVENTION

An object of one embodiment of the present invention is to improve a balancing of rotationally symmetrical components, particularly rotor components.

The object is achieved by a method of the present invention. A system or a computer program product for carrying out a method is also achieved by the present invention. Advantageous embodiments of the invention are set forth in detail below.

According to one aspect of the present invention, in one method for determining a balancing removal process for a balancing device for the balancing of a rotationally symmetrical component, particularly a rotor component, a combination of machining length and machining depth, taking into account or respecting a pre-defined maximum (permissible) machining length or upper limit for a machining length and minimum (possible) machining depth or lower limit for machining depth, in one embodiment additionally taking into account or respecting a pre-defined minimum (possible) machining length or lower limit for machining length, and/or maximum (permissible) machining depth or upper limit for machining depth, is calculated, particularly with the provision that (taking into account or respecting the pre-defined maximum and optionally minimum machining lengths and minimum and optionally maximum machining depths or upper limits or lower limit(s)), with permissible combinations for compensation of the same unbalance or with combinations of equal balancing effects, particularly combinations that can be implemented by or with the balancing device, the machining length of the calculated combination is longer than the machining length of at least one, particularly several, preferably the majority of, in particular all (of the) other permissible combination(s) and at the same time, the machining depth of the calculated combination is shallower than the machining depth of this (these) other combination(s).

In one embodiment, the balancing removal process is distributed thereby over a larger peripheral region, particularly in the framework of the pre-defined maximum machining length, a peripheral region that is as large as possible, of the rotationally symmetrical component. In this way, in one embodiment, an error tolerance vis-a-vis a measured angular position of the unbalance can be improved.

The rotationally symmetrical component in one embodiment is provided as a rotor component, particularly configured for the purpose of rotating around an axis of rotation during operation; in one embodiment this is a (main) machine axis of a turbomachine, particularly of a gas turbine; in one embodiment, particularly of an aircraft engine. In one embodiment, in particular, it can have a bladed rotor of the turbomachine, particularly the gas turbine, formed integrally therewith; in particular, it can be such a bladed rotor, thus particularly a so-called blisk.

In or for such rotationally symmetrical components, particularly rotor components, in which, on the one hand, unbalances are especially unfavorable, and, on the other hand, which are increasingly produced in large numbers, especially in an at least partially automated way, the present invention can be used with particular advantage, so that it will be explained in the following particularly with reference thereto, but without being limited thereto.

The machining depth can determine, in particular, a radial and/or maximum or average depth, particularly a radial and/or maximum or average groove depth of the balancing removal process, or a radial and/or maximum or average insertion depth, in particular a cutting depth, of the balancing device; in particular, it can be this depth.

The machining length can define or can be, in particular, a length of the balancing removal process that is measured in the peripheral direction around the axis of rotation of the rotationally symmetrical component, particularly the rotor component, between a beginning and an end (in the peripheral direction) of a groove or insertion or of a groove base or of a section with a constant radial depth or insertion of the balancing removal process or a corresponding angle or corresponding angles, for example, milling angle(s), in particular.

In the sense of the present invention, in one embodiment, two combinations of machining length and machining depth for compensating the same unbalance define or produce the same product of a mass of the balance removal process and the distance between its center of gravity and the axis of rotation of the rotationally symmetrical component, particularly the rotor component. In other words, two combinations are thus, in particular, combinations of machining length and machining depth for compensating the same unbalance in the sense of the present invention, if the two combinations (especially in the case of otherwise identical parameters or boundary conditions) define or produce the same product of mass and center-of-gravity distance between the balancing removal process and the axis of rotation of the rotationally symmetrical component.

Correspondingly, in one embodiment, the unbalance compensated by or through a machining length and machining depth, thus, in particular, the product of mass and center-of-gravity distance between the balancing removal process and the axis of rotation of the rotationally symmetrical component is calculated by or through this machining length and machining depth for one or more permissible combination(s) of machining length and machining depth.

In one embodiment, a tool of the balancing device for the machining is inserted on an input path into the rotationally symmetrical component down to the machining depth and leaves the component on an output path. Then, in the sense of the present invention, the machining length can determine or, in particular, can be the length (in the peripheral direction) between the beginning of the input path and the end of the output path, i.e., the total length of the balancing removal process in the peripheral direction, or also the length (in the peripheral direction) between the end of the input path and the beginning of the output path, i.e., the arc length of the balancing removal process or of the groove base in the peripheral direction.

In one embodiment, the machining depth defines a removal of material at an inner periphery of the rotationally symmetrical component. In other words, in one embodiment, the balancing removal process is a balancing removal process at an inner periphery of the rotationally symmetrical component.

In one embodiment, an error tolerance relative to an angular position of the balancing removal process can be improved thereby.

In one embodiment, the machining depth defines a removal of material at an outer periphery of the rotationally symmetrical component. In other words, in one embodiment, the balancing removal process is a balancing removal process at an outer periphery of the rotationally symmetrical component.

In one embodiment, shallower machining depths are required thereby.

In an additional or alternative embodiment, the tool for the machining can be inserted into the rotationally symmetrical component onto a path running horizontally to the surface to be machined. A tool guided onto such a path running along the radial direction when viewed toward the component can also reach into narrower places, for example, at an intermediate space in a rotor assembly and compensate for unbalances that cannot be reached via a path running in the axial direction. In particular, a disassembling of coordinated rotor components lying next to one another can be avoided thereby. Said length can then also be understood to be the length between beginning of the input path and end of the output path in the radial direction.

In one embodiment, in particular, the maximum machining length and in an enhancement also the minimum machining length, and/or the minimum machining depth and in an enhancement also the maximum machining depth are pre-defined by a user or a user input and/or as a function of the balancing device and/or of the rotationally symmetrical component.

Advantageously, machining boundary conditions such as, in particular, minimum insertion depths (depth changes) of the balancing device can be taken into consideration thereby, and/or different kinds of rotationally symmetrical components can be balanced specifically (more specifically). In this way, the number of permissible combinations for compensation can be reduced.

Surprisingly, as particularly advantageous, a maximum machining (circular arc) length of at most 180°, in particular of at most 150°, preferably at most 130°, and a minimum machining depth of at least 0.005 mm, particularly of at least 0.01 mm, and/or at most 0.5 mm, in particular of at most 0.1 mm have resulted, particularly in combination with one another.

In one embodiment, the balancing removal process is determined on the basis of or as a function of a measured unbalance, particularly for compensation, of the rotationally symmetrical component, particularly the rotor component, to be machined, in particular, on the basis of or taking into account a pre-defined unbalance tolerance that is or will be pre-defined by a user in one embodiment, and/or as a function of the rotationally symmetrical component, in particular of an unbalance tolerance necessary for it, and/or of the balancing device, particularly of a balancing tolerance that can be achieved thereby.

In this way, each of the boundary conditions, particularly in combination with one another, particularly machine and/or manufacturing-related boundary conditions of the balancing device, and additionally or alternatively, particularly aerodynamic and/or mechanical boundary conditions of the rotationally symmetrical component, particularly the rotor component, can be taken into account.

In one embodiment, the method for determining the balancing removal process will be carried out numerically.

In this way, in one embodiment, the precision can be improved.

Additionally or alternatively, in one embodiment, the method will be carried out by a control (for controlling) the balancing device.

In one embodiment, the machining can be accelerated in this way.

Additionally or alternatively, the method is conducted iteratively, thus in particular, the machining length and/or the machining depth is/are increased stepwise; in one embodiment, in iteration loops, particularly nested loops, and in this case, in one embodiment, each time, the unbalance compensated by or through this machining length or machining depth, thus, in particular, the product of mass and center-of-gravity distance between the balancing removal process and the axis of rotation of the rotationally symmetrical component is calculated by or through this machining length or machining depth.

This is possible in one embodiment with little calculating time and/or calculating power, and thus is particularly advantageous, particularly for carrying out on CNC machines or the like.

In an enhancement, when the method is carried out, for the iterative determination of the machining length and/or machining depth, a step width is adaptively changed, particularly reduced, preferably stepwise.

In this way, in one embodiment, the calculating time can be reduced advantageously, and/or the accuracy can be improved.

According to one aspect of the present invention, a method for balancing the rotationally symmetrical component, particularly the rotor component, by means of the balancing device comprises the steps of:

determining the balancing removal process by means of a method described here, thus particularly iterative and/or by a control (for controlling) the balancing device; and machining, in one embodiment particularly a machining by cutting, which removes material from the rotationally symmetrical component on the basis of the determined balancing removal process, particularly for the implementation of the determined balancing removal process.

In one embodiment, prior to determining the balancing removal process, particularly by the balancing device or by a measuring instrument separate therefrom, the unbalance of the rotationally symmetrical component (that is to be compensated) is measured.

Additionally or alternatively, in one embodiment, after machining the rotationally symmetrical component, in particular by the balancing device or by a or the measuring instrument separate therefrom, the (remaining, residual) unbalance of the rotationally symmetrical component is measured.

If this unbalance exceeds a pre-defined maximum permissible unbalance, in one embodiment, the method is carried out again and as many times as needed, whereby the balancing removal process is then determined on the basis of or as a function of this remaining, residual unbalance, particularly for compensation thereof.

According to one aspect of the present invention, a system, particularly hardware and/or software, particularly a program, for carrying out a method described here is configured with and/or has:

means for calculating a combination of machining length and machining depth taking into account a pre-defined maximum machining length and minimum machining depth, such that under permissible combinations for compensating the same unbalance, the machining length of the calculated combination is longer than the machining length of at least one other permissible combination and, at the same time, the machining depth of the calculated combination is shallower than the machining depth of this other combination.

In one embodiment, the system or its means has:

means for predefining the maximum machining length and/or the minimum machining depth by a user and/or as a function of the balancing device and/or of the rotationally symmetrical component, particularly the rotor component; and/or means for numerically determining the balancing removal process, by a control of the balancing device and/or, particularly step-width-adaptive, iterative, particularly under stepwise increase of the machining length and/or machining depth, and/or on the basis of a measured unbalance of the rotationally symmetrical component to be machined, particularly on the basis of an unbalance tolerance pre-defined by a user and/or as a function of the rotationally symmetrical component and/or the balancing device.

According to one aspect of the present invention, for the balancing of a or the rotationally symmetrical component, particularly a or the rotor component, particularly of a turbomachine, by means of a balancing device, a system has:

means for determining the balancing removal process comprising means for calculating a combination of machining length and machining depth taking into account a pre-defined maximum machining length and a minimum machining depth, such that under permissible combinations for compensating the same unbalance, the machining length of the calculated combination is longer than the machining length of at least one other permissible combination, and at the same time, the machining depth of the calculated combination is shallower than the machining depth of this other combination; and means for machining the rotationally symmetrical component, particularly the rotor component, on the basis of the determined balancing removal process;

and in an enhancement, means for measuring the unbalance of the rotationally symmetrical component, particularly the rotor component, prior to determining the balancing removal process, and/or after the machining of the rotationally symmetrical component, particularly the rotor component.

In the sense of the present invention, a means can be designed technically by hardware and/or software, particularly a data-associated or signal associated—especially a digital—processing unit (CPU), particularly a microprocessor unit (CPU), preferably with a memory and/or bus system, and/or can have one or a plurality of programs or program modules. The CPU can be designed for the purpose of executing commands that are implemented as a program filed in a memory system, to detect input signals from a data bus, and/or to deliver output signals to a data bus. A memory system can have one or more, in particular different, memory media, particularly optical, magnetic, hard-drive, and/or other non-volatile media. The program can be created in such a way that it incorporates or is capable of executing the method described here, so that the CPU can execute the steps of such a method and thus particularly can determine a balancing removal process or can operate the balancing device, in particular, it can control it. In one embodiment, a computer program product can have, in particular can be, a storage medium, in particular a nonvolatile one, for storing a program or having a program stored thereon, wherein an execution of this program initiates a system or a control, particularly a computer, for the purpose of executing a method described here or one or more of its steps.

In one embodiment, one or more, in particular all, steps of the method are conducted completely or partially in an automated way, particularly by the system or its means.

BRIEF DESCRIPTION OF THE DRAWING FIGURES

Additional advantageous enhancements of the present invention can be taken from the dependent claims and the following description of preferred embodiments. For this purpose and partially schematized:

DESCRIPTION OF THE INVENTION

Figure 1:
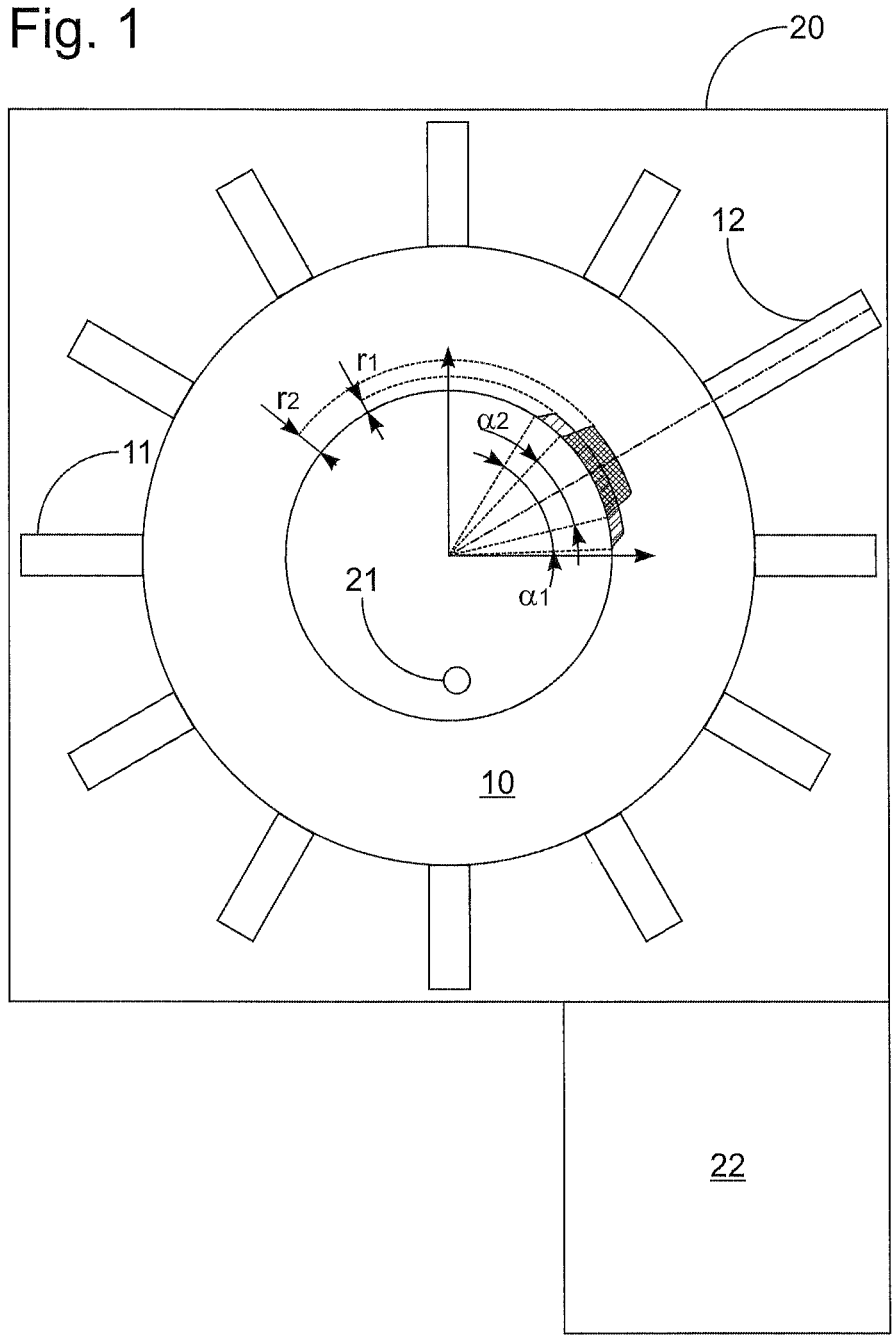
FIG. 1 shows a system for the balancing of a rotationally symmetrical component according to one embodiment of the present invention.

FIG. 1 shows a system for the balancing of a rotationally symmetrical component, particularly a rotor component, by way of example, in the form of a blisk 10 of a gas turbine with integrally designed rotating blades 11, of which, and again by way of example, one rotating blade 12 is radially longer, so that the blisk 10 has an unbalance at this position, which is indicated by a dotted line.

The system has a balancing device in the form of a milling machine 20 with a milling cutter (tool) 21 and a control 22.

In a first step S10, on a separate measuring instrument (not shown) in a way known in and of itself, the unbalance is measured in the form of a product of the dimension [mass*radius] and the (angular) position thereof in a fixed-component reference system, which is indicated in FIG. 1 by a coordinate system.

In a second step S20, it is first examined whether the measured unbalance is (already) smaller than a permissible maximum value for the blisk 10. If this is the case (S20: "Y"), the method is terminated, and the blisk 10 is classified as balanced (S25).

In the contrary case (S20: "N"), the blisk 10 is fastened in the milling machine 20, the control 22 of which carries out following steps S30-S85.

In a step S30, based on user specifications that have been entered, different values will be initialized, particularly beginning value and maximum value for the iterative determination of a cutting depth and a circular arc length of machining, particularly a minimum and a maximum insertion depth of the milling cutter 21, as well as a maximum circular arc length of machining.

For this purpose, by way of example, a first cutting depth $r_1$ in the case of a minimum insertion that can be represented with the milling machine 20, as well as a second cutting depth $r_2$ are indicated in FIG. 1.

Also indicated by way of example in FIG. 1 is a (circular arc) length of machining in the form of a milling angle $\alpha_1$ or $\alpha_2$. For illustration, $\alpha_1$ or $\alpha_2$ here denote the total length of the respective balancing removal process or groove. In a modification, the length of the groove base of constant cutting depth or of the corresponding cutting angle can also be used equally as the machining length, so that in this case, a machining length equal to zero corresponds to an insertion on an input path determined by the milling cutter 21 down to the machining depth and immediate exiting again on an output path determined by the milling cutter 21.

In a step S30, the control 22 calculates the unbalance to be compensated thereby for the current machining depth and machining length and compares this to the measured unbalance in a step S50.

If the unbalance to be compensated by the current machining depth and machining length is (still) smaller than the measured unbalance minus a pre-defined unbalance tolerance (S50: "Y"), the control continues with step S60.

In the opposite case (S50: "N"), the control continues with step S80 and examines whether the unbalance to be compensated by the current machining depth and machining length is (already) greater than the measured unbalance plus the pre-defined unbalance tolerance.

If this is not the case, i.e., if the unbalance to be compensated by the current machining depth and machining length lies in a tolerance range limited by the pre-defined unbalance tolerance around the measured unbalance (S50: "N" AND S80: "N"), in a step S90, the blisk 10 is machined with this current machining depth and machining length, i.e., the milling cutter 21 is driven onto the input path symmetrically to the measured position of the unbalance down to the current machining depth, and then driven on this path up to the output path and is extracted from the blisk 10 on this output path. The input path and the output path can be determined, for example, by the maximally permissible or possible advance of the milling cutter 21.

Subsequently, the machined blisk 10 is removed and its (remaining, residual) unbalance is measured again on the separate measuring instrument, and the method is carried out again.

In step S60, i.e., when the unbalance to be compensated by the current machining depth and machining length is (still) smaller than the measured unbalance minus the pre-defined unbalance tolerance or this was established in step S50, the control examines whether the current machining length already corresponds to the pre-defined maximum machining length or exceeds the latter.

If this is still not reached during the current iteration (S60: "N"), the machining length is increased in a step S65 by a pre-defined discrete step and thus step S40 is carried out again.

Thus, in this way, during an iteration step for the same current machining depth, beginning with the pre-defined minimum cutting depth, the machining length is increased stepwise until the unbalance to be compensated by the current machining depth and machining length is no longer smaller than the measured unbalance minus the pre-defined unbalance tolerance (S50: "N") or, however, the pre-defined maximum machining length is reached (S60: "Y") in this iteration step.

If the latter is the case, i.e., if the pre-defined maximum machining length is reached (S60: "Y"), the control examines in step S70 whether the current machining depth already corresponds to the pre-defined maximum machining depth.

If this is still not reached during the current iteration (S70: "N"), the current machining length is increased in a step S75 by a pre-defined discrete step, which corresponds to the minimum cutting depth, the current machining length is again set to its initial value, and thus step S40 is carried out once more.

Thus, in this way, in an inner iteration loop, first the machining length is increased stepwise each time, and, if needed, in an outer iteration loop, the machining depth is increased stepwise each time.

If, with the pre-defined maximum machining length (S60: "Y") the pre-defined maximum machining depth was reached (S70: "Y"), the measured unbalance cannot be compensated and the method is interrupted with an error message (S76).

If the unbalance to be compensated by the current machining depth and machining length is (already) greater than the measured unbalance plus the pre-defined unbalance tolerance (S80: "Y"), the control continues with step S85, in which it sets the current machining length back to the preceding machining length, reduces the step width for the stepwise increase in the machining length (see step S65) by a pre-defined factor, for example 10, and with this step width adaptively adjusted in such a way again carries out step S40 for the (increase in the) machining length.

In this way, first an (initial) step interval can be rapidly found for the machining length, and then this can be subsequently refined gradually.

The method is illustrated in FIG. 1 in a very schematic manner: Initially, in the case of the first machining depth $r_1$, the machining length is increased gradually and it is examined whether the measured unbalance, which is suggested by the longer blade 12 in the exemplary embodiment, can be compensated therewith. (Only) if this is not the case (even with the maximum permissible machining length) is the machining depth increased to $r_2$ and, in turn, proceeding from the same initial value, the machining length is increased gradually, and it is examined whether the measured unbalance can now be compensated.

As also illustrated schematically in FIG. 1, a measured unbalance can be compensated by a plurality of various combinations of machining depth and machining length, for example, by the combination, which is indicated in FIG. 1, of machining depth $r_1$ and machining length al belonging thereto, or the combination of (deeper) machining depth $r_2$ and (shorter) machining length $\alpha_2$ belonging thereto, wherein the combination with the shallowest machining depth is automatically calculated by the method with utilization of the permissible machining length.

Figure 3:
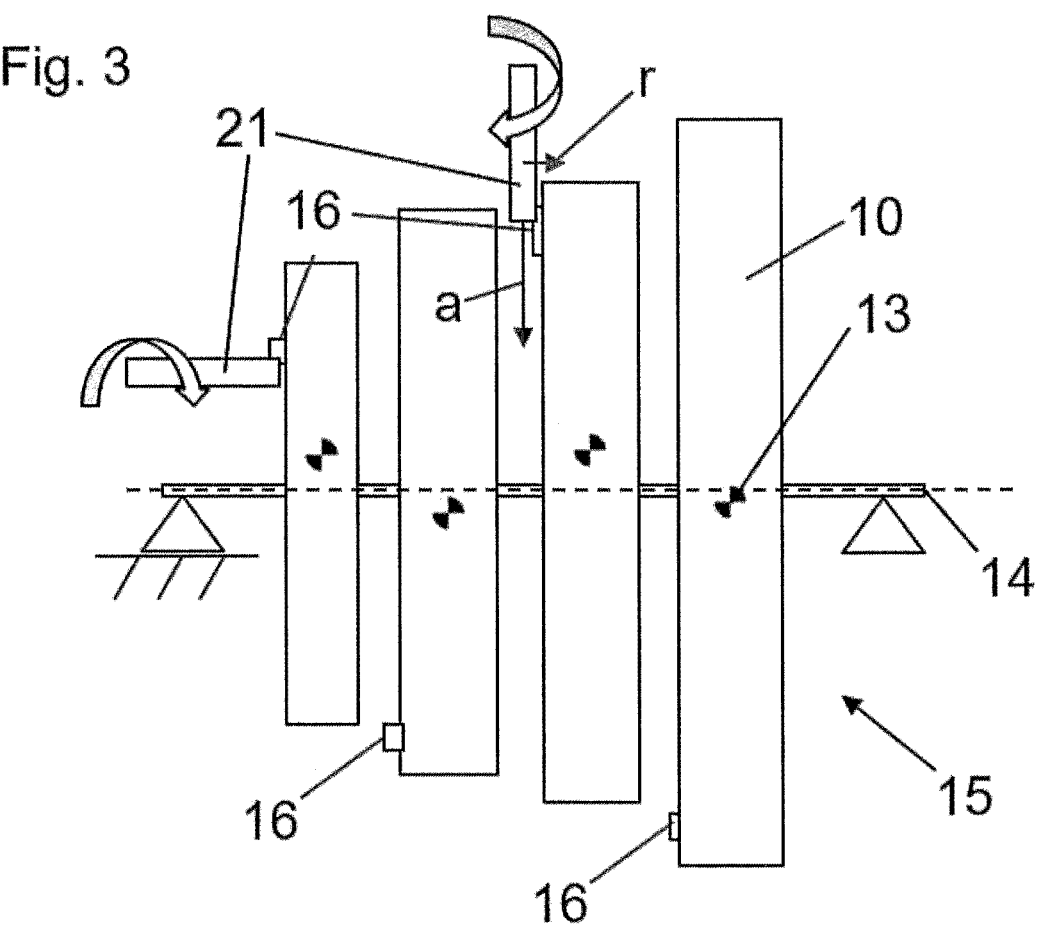
FIG. 3 shows a system for the balancing of an assembly of rotationally symmetrical components.

FIG. 3 shows schematically a system for balancing an assembly 15 made of rotor components 10 or of rotationally symmetrical components 10. The individual rotor components 10 are coupled together in an assembly, in the installed state, for example, via a rotor axis 14 or, when the assembly 15 is completely dismounted from an engine, for example, also via connection pieces and/or so-called rotor arms (not shown) arranged between the individual rotor components 10.

Figure 2:
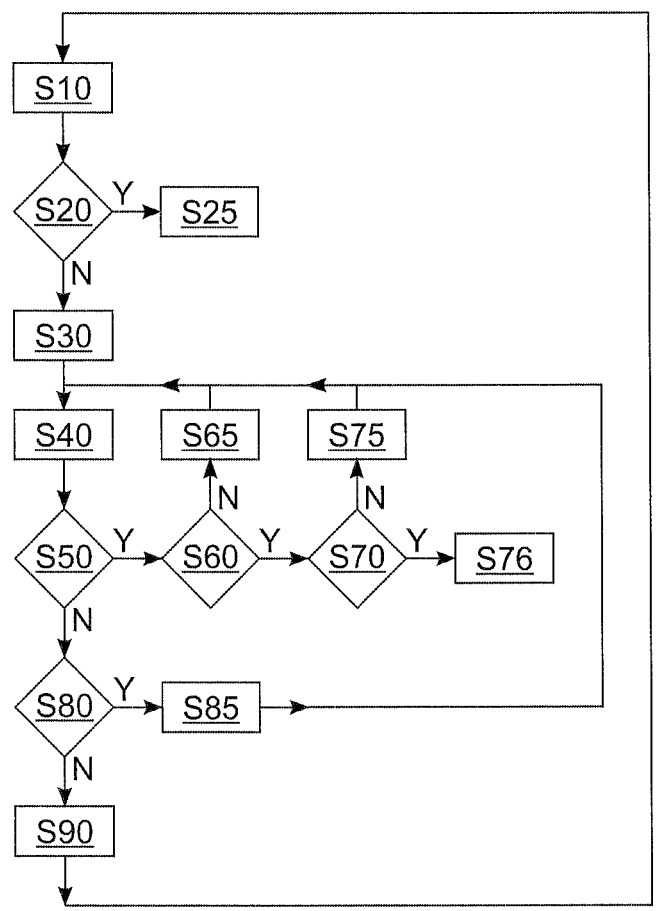
FIG. 2 shows a method for the balancing of the rotationally symmetrical component according to one embodiment of the present invention.

Corresponding to the method described on the basis of FIG. 2, first the unbalance(s) are determined for each rotor component 10 and/or for the entire assembly 15. The determination can be produced on the basis of an individual deviation of one center of gravity 13 of a rotor component 10. It can also be provided, however, that at least some or all of the centers of gravity 13 of some or all rotor components 10 of the assembly enter into the determination. The sites of unbalance 16 thus determined shall then be removed by one or more, possibly different, milling cutters 21.

In this case, it may happen that sites of unbalance 16, which are presented as in FIG. 3, can be determined in such a way that a machining by a removal of material with a milling cutter 21 that is introduced in the direction of the rotor axis 14 would be possible only with difficulty, a machining in this axial direction would be disadvantageous, or, a disassembling of the assembly 15 into the individual rotor components 10 would be necessary.

In such a case, a milling cutter 21 is brought into the desired position essentially perpendicular to the rotor axis 14 of the assembly 15 or of the rotor component 10, i.e., in radial direction, in order to be able to remove material in the necessary radial machining depth r and radial machining length a. It can additionally be provided that the milling cutter 21 is extracted in the peripheral direction following an angular region α (not shown). The angular region α can also enter into the determination of the unbalance.

In the case of an assembly 15, it can be provided that the steps S10 to S90 go through all combinations of machining depth and machining length one after the other, that is, steps S10 to S90 are run for each individual rotor component 10, but then are placed in relation to one another. It can also be provided that first all unbalances of the entire assembly 15 are determined; in other words, the total unbalance of the assembly 15 is determined. In this case, for example, the combinations of the individual machining depth and machining length of the individual rotor components can be compared with one another. In this case, it can be examined whether the unbalances relative to one another are compatible and an inadmissible load does not arise for the assembly, and such a load can then be avoided advantageously in a targeted manner.

Although exemplary embodiments were explained in the preceding description, it shall be noted that a plurality of modifications is possible.

In one embodiment, it can be examined, for example, whether even with minimum (possible or permissible) cutting depth and machining length, the balancing removal process would be too extensive, and in this case, the method is interrupted with an error message.

In addition, it shall be noted that the exemplary embodiments only involve examples that in no way shall limit the scope of protection, the applications and the construction. Rather, a guide is given to the person of ordinary skill in the art by the preceding description for implementing at least one exemplary embodiment, whereby diverse changes, particularly with respect to the function and arrangement of the described components, can be carried out without departing from the scope of protection, as it results from the claims and combinations of features equivalent to these.

What is claimed is:

1. A method for determining a balancing removal process for a balancing device for balancing a rotationally symmetrical component, wherein a combination of machining lengths and machining depths is calculated taking into account a pre-defined maximum machining length and a pre-defined minimum machining depth, in such a way that, with permissible combinations for compensating the same unbalance, the machining length of the calculated combination is longer than the machining length of at least one other permissible combination and, at the same time, the machining depth of the calculated combination is shallower than the machining depth of said other combination; further comprising the step of calculating a combination of machining length and machining depth taking into consideration a pre-defined maximum machining length and minimum machining depth wherein, under permissible combinations for the compensation of the same unbalance, the machining length of the calculated combination is longer than the machining length of at least one other permissible combination and, at the same time, the machining depth of the calculated combination is shallower than the machining depth of this other combination.

2. The method according to claim 1, wherein the machining depth defines a removal of material at an inner or outer periphery of the rotationally symmetrical component.

3. The method according to claim 1, wherein the maximum machining length and/or the minimum machining depth are pre-defined by a user and/or as a function of the balancing device and/or the rotationally symmetrical component.

4. The method according to claim 1, wherein a balancing removal process is determined on the basis of a measured unbalance of the rotationally symmetrical component to be machined and on the basis of an unbalance tolerance pre-defined by a user and/or as a function of the rotationally symmetrical component and/or the balancing device.

5. The method according to claim 1, wherein it is numerically carried out by a control of the balancing device and/or, carried out in a step-width-adaptive and iterative manner with stepwise increase of the machining length and/or machining depth.

6. The method according to claim 1, wherein the rotationally symmetrical component comprises a bladed rotor component of a gas turbine.

7. The method according to claim 1, further comprising the steps of:
determining the balancing removal process; and
machining the rotationally symmetrical component on the basis of the determined balancing removal process.

8. The method according to claim 7, further comprising the step of:
measuring the unbalance of the rotationally symmetrical component prior to determining the balancing removal process, and/or after the machining of the rotationally symmetrical component.

9. The method of claim 1, wherein the method is carried out by a computer program having program code that is stored on a medium readable by a computer.

10. The method of claim 1, wherein the balancing removal process forms a groove having a machining length in a peripheral direction of the rotationally symmetrical component and a machining depth in a radial direction of the rotationally symmetrical component.

11. A method for determining a balancing removal process for a balancing device for balancing a rotationally symmetrical component, wherein a combination of machining lengths and machining depths is calculated taking into account a pre-defined maximum machining length and a pre-defined minimum machining depth, in such a way that, with permissible combinations for compensating the same unbalance, the machining length of the calculated combination is longer than the machining length of at least one other permissible combination and, at the same time, the machining depth of the calculated combination is shallower than the machining depth of said other combination; wherein the method is carried out in a step-width-adaptive and iterative manner with stepwise increase of the machining length and/or machining depth.

12. The method according to claim 11, wherein the machining depth defines a removal of material at an inner or outer periphery of the rotationally symmetrical component.

13. The method according to claim 11, wherein the maximum machining length and/or the minimum machining depth are pre-defined by a user and/or as a function of the balancing device and/or the rotationally symmetrical component.

14. The method according to claim 11, wherein a balancing removal process is determined on the basis of a measured unbalance of the rotationally symmetrical component to be machined and on the basis of an unbalance tolerance pre-defined by a user and/or as a function of the rotationally symmetrical component and/or the balancing device.

15. The method according to claim 11, wherein the rotationally symmetrical component comprises a bladed rotor component of a gas turbine.

16. The method according to claim 11, further comprising the steps of:
   determining the balancing removal process; and
   machining the rotationally symmetrical component on the basis of the determined balancing removal process.

17. The method according to claim 16, further comprising the step of:
   measuring the unbalance of the rotationally symmetrical component prior to determining the balancing removal process, and/or after the machining of the rotationally symmetrical component.

18. The method of claim 11, wherein the method is carried out by a computer program having program code that is stored on a medium readable by a computer.

* * * * *